(12) United States Patent
Li

(10) Patent No.: US 12,095,156 B2
(45) Date of Patent: Sep. 17, 2024

(54) TERMINAL DEVICE

(71) Applicant: VIVO MOBILE COMMUNICATION CO., LTD., Guangdong (CN)

(72) Inventor: Rihui Li, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 504 days.

(21) Appl. No.: 17/340,932

(22) Filed: Jun. 7, 2021

(65) Prior Publication Data
US 2021/0296766 A1    Sep. 23, 2021

Related U.S. Application Data

(63) Continuation of application No. PCT/CN2019/117439, filed on Nov. 12, 2019.

(30) Foreign Application Priority Data

Dec. 12, 2018  (CN) .......................... 201811517962.9

(51) Int. Cl.
*H01Q 1/24* (2006.01)
*H01Q 1/48* (2006.01)
*H04M 1/02* (2006.01)

(52) U.S. Cl.
CPC ............... *H01Q 1/48* (2013.01); *H01Q 1/243* (2013.01); *H04M 1/0264* (2013.01)

(58) Field of Classification Search
CPC ..... H01Q 1/241–243; H01Q 1/48; H01Q 1/22
See application file for complete search history.

(56) References Cited

U.S. PATENT DOCUMENTS

| 8,907,853 B2* | 12/2014 | Ying | H01Q 1/521 |
| | | | 343/893 |
| 10,297,905 B2* | 5/2019 | Lu | H01Q 5/392 |
| 11,011,837 B2* | 5/2021 | Wu | H01Q 21/28 |
| 2013/0057437 A1 | 3/2013 | Chiu et al. | |
| 2013/0099984 A1 | 4/2013 | Jung | |
| 2013/0135157 A1 | 5/2013 | Tsou et al. | |
| 2014/0292590 A1* | 10/2014 | Yoo | H01Q 5/371 |
| | | | 343/702 |

(Continued)

FOREIGN PATENT DOCUMENTS

| CN | 202050592 U | 11/2011 |
| CN | 102983405 A | 3/2013 |

(Continued)

OTHER PUBLICATIONS

EP Search Report in Application No. 19896517.0 dated Jan. 4, 2022.

(Continued)

*Primary Examiner* — Hasan Islam
(74) *Attorney, Agent, or Firm* — Brooks Kushman P.C.

(57) ABSTRACT

A terminal device is provided, including: a metal frame; a first metal sheet, where a feed point is disposed on the first metal sheet, the first metal sheet is connected to the metal frame, and there is a first gap between the metal frame and a part of the first metal sheet that is not connected to the metal frame; and a grounding plate, where the grounding plate is connected to the metal frame through a connection piece.

11 Claims, 3 Drawing Sheets

(56) References Cited

U.S. PATENT DOCUMENTS

| | | | | |
|---|---|---|---|---|
| 2015/0048979 A1* | 2/2015 | Asrani | ................... | H01Q 5/50 |
| | | | | 343/702 |
| 2016/0049719 A1 | 2/2016 | Tseng et al. | | |
| 2016/0064820 A1* | 3/2016 | Kim | ..................... | H01Q 1/243 |
| | | | | 343/767 |
| 2016/0087340 A1 | 3/2016 | Tseng et al. | | |

FOREIGN PATENT DOCUMENTS

| | | |
|---|---|---|
| CN | 103094717 A | 5/2013 |
| CN | 103138042 A | 6/2013 |
| CN | 104409828 A | 3/2015 |
| CN | 104701619 A | 6/2015 |
| CN | 204795924 U | 11/2015 |
| CN | 109659672 A | 4/2019 |
| KR | 20120047711 A | 5/2012 |
| TW | M253916 U | 12/2004 |
| TW | M495681 U | 2/2015 |

OTHER PUBLICATIONS

CN Office Action in Application No. 201811517962.9 dated Dec. 10, 2019.
CN Office Action in Application No. 201811517962.9 dated Jul. 7, 2020.
International Search Report and Written Opinion in Application No. PCT/CN2019/117439 dated Jun. 24, 2021.

\* cited by examiner

TERMINAL DEVICE

CROSS-REFERENCE OF RELATED APPLICATION

This application is continuation application of PCT International Application No. PCT/CN2019/117439 filed on Nov. 12, 2019, which claims priority to Chinese Patent Application No. 201811517962.9 filed in China on Dec. 12, 2018, the disclosures of which are incorporated herein by reference in their entireties.

TECHNICAL FIELD

The present disclosure relates to the field of electronic technologies, and in particular, to a terminal device.

BACKGROUND

In recent years, in mobile terminals with a metal frame appearance, an antenna form of a planar inverted-F antenna (PIFA) is often used to design a WIFI antenna, a GPS antenna, a 4×4 multiple-input multiple-output (MIMO) antenna, or the like. Its structural design form is shown in FIG. 1. 101 is a metal frame, and 102 is a reference ground. There is a gap 103 between 101 and 102, and the gap 103 is filled with a non-metal material such as plastic. 104 is a flexible printed circuit (FPC) or an antenna sheet produced through a laser-direct-structuring (LDS) process. A non-metal material such as plastic is also filled between 104 and 102. 105 is a signal source and feeds electricity to the antenna 104 generally through the feed point 41 (a connection form can be a spring). Meanwhile, the antenna sheet 104 is grounded through the grounding point 42. Finally, the common PIFA antenna form is achieved. In addition, the metal frame 101 generally has two grounding points 110 and 120 at both ends of the antenna sheet 104, and a spring is generally used to achieve the connection, to achieve desirable grounding of the metal frame 101 in the antenna region to reduce impact on the antenna.

Because internal space of the mobile terminal is very limited, the height between the antenna sheet 104 and the reference ground 102 is very short and is generally 0.5 mm to 2 mm and is typically 1 mm. At the same time, the height from the antenna sheet 104 to a plane of an edge of the metal frame 101 near the back cover of the mobile terminal is about 1 mm. That is, the height of the PIFA antenna is very short. As can be seen from the basic theory of antennas, the antenna efficiency is very low. Generally, the average efficiency of the WIFI 2.4G antenna is less than 15%. In addition, the FPC or the antenna produced through the LDS process is used. As a result, costs are also increased.

SUMMARY

The embodiments of the present disclosure provide a terminal device.

The present disclosure is implemented as follows:

an embodiment of the present disclosure provides a terminal device, including:
a metal frame;
a first metal sheet, where a feed point is disposed on the first metal sheet, the first metal sheet is connected to the metal frame, and there is a first gap between the metal frame and a part of the first metal sheet that is not connected to the metal frame; and
a grounding plate, where the grounding plate is connected to the metal frame through a connection piece.

In the embodiments of the present disclosure, the first metal sheet connected to the metal frame is used as an antenna sheet, the metal frame is directly grounded, and a grounding connection device of the first metal sheet is omitted, thereby reducing the costs of the antenna. In addition, the first metal sheet is connected to the metal frame, and the part used as an antenna radiator also includes the metal frame in addition to the first metal sheet, which increases the area required by the antenna and improves the antenna radiation efficiency.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
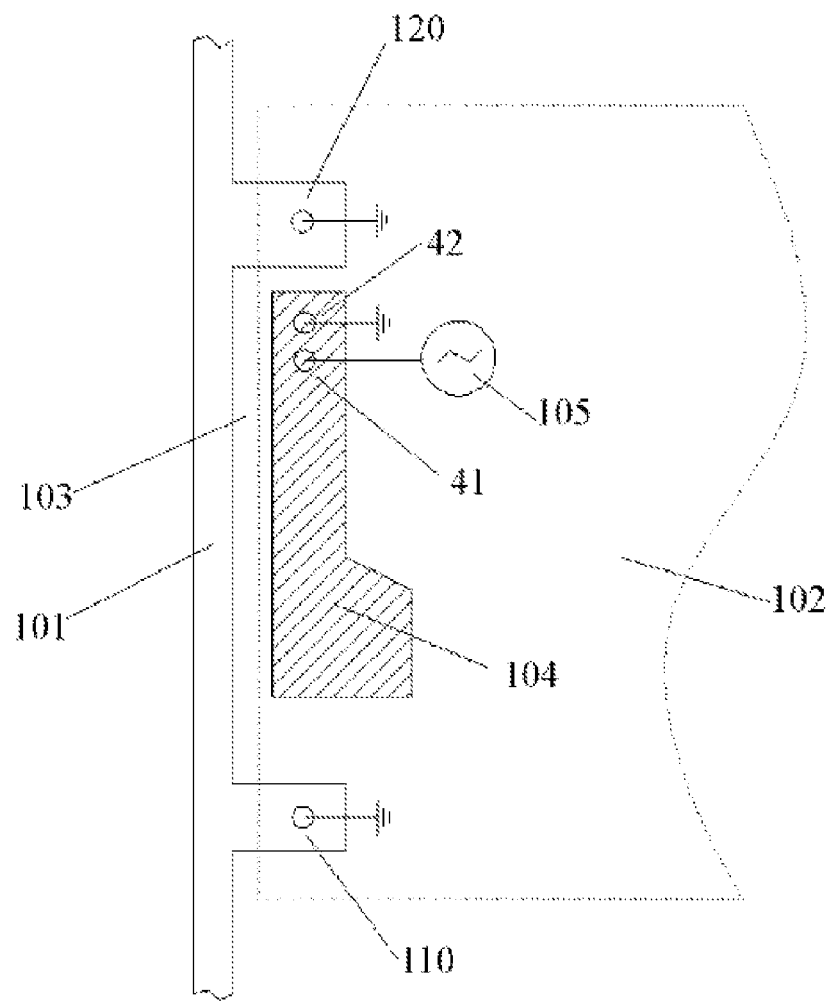
FIG. 1 is a schematic diagram of an antenna structure of a terminal device in the related art.
Figure 2:
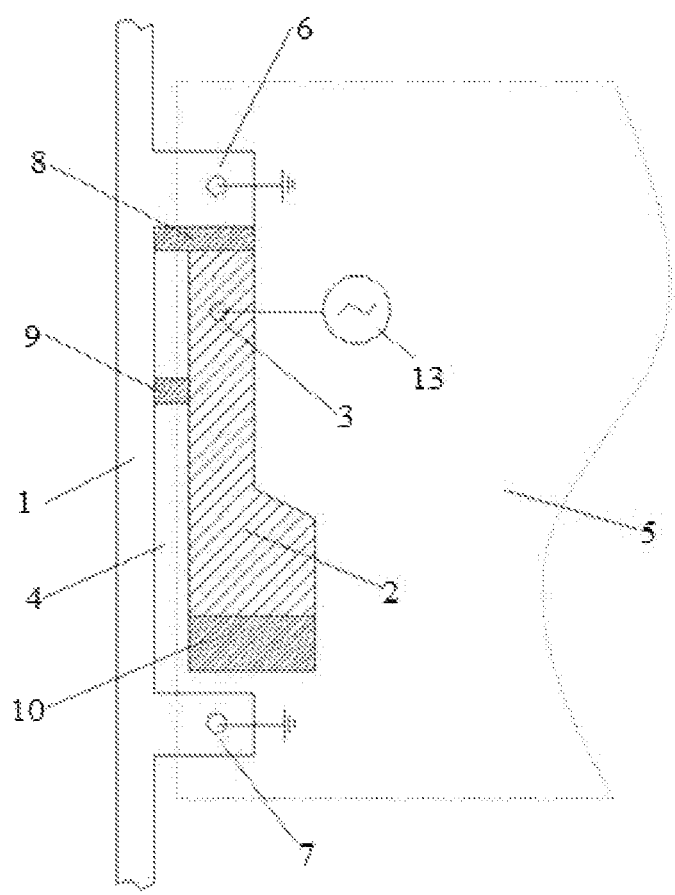
FIG. 2 is a structural schematic diagram 1 of a terminal device according to an embodiment of the present disclosure.

As shown in FIG. 2, FIG. 2 is a structural schematic diagram of a terminal device according to an embodiment of the present disclosure. The terminal device includes: a metal frame 1; a first metal sheet 2, where a feed point 3 is disposed on the first metal sheet 2, the first metal sheet 2 is connected to the metal frame 1, and there is a first gap 4 between the metal frame 1 and a part of the first metal sheet 2 that is not connected to the metal frame 1; and a grounding plate 5, where the grounding plate 5 is connected to the metal frame 1 through a connection piece.

It should be noted that the grounding plate 5 is used as the antenna's reference ground, and includes: a main board and a metal plate with a preset area that is connected to the main board.

Herein, a plane of the first metal sheet 2 is roughly parallel to the grounding plate 5, and the vertical distance between the first metal sheet 2 and the grounding plate 5 is greater than or equal to 0.5 mm. Being roughly parallel includes being parallel and being not parallel. Being not parallel refers to that the first metal sheet 2 slightly inclines relative to the grounding plate 5, and an angle between an extending line of the first metal sheet 2 and a plane formed by the grounding plate 5 is small and smaller than a preset value. The preset value can be determined according to actual needs. Optionally, the vertical distance between the first metal sheet 2 and the grounding plate 5 is greater than 1 mm.

If the vertical distance from the first metal sheet 2 to the grounding plate 5 is H1, and the vertical distance from the side of the metal frame 1 close to the first metal sheet 2 to the grounding plate 5 is H2, H1 is greater than H2 minus 1.5 mm.

Further, the direction of the long side of the first metal sheet 2 is parallel to the direction of the long side of the metal frame 1.

Herein, the terminal device also includes: a signal source 13, one end of the signal source 13 is grounded, and the other end is connected to the feed point 3. That is, the signal source 13 feeds electricity to the first metal sheet 2 through the feed point 3. A connection manner includes: a spring, a screw, or the like.

Optionally, one end of the signal source 13 is connected to the grounding plate 5.

It should be noted that the grounding plate 5 is connected to the metal frame 1 through a connection piece.

Because the grounding point of the first metal sheet 2 is changed to directly connect to the metal frame 1 and the grounding point of the first metal sheet 2 is closer to the frame of the metal frame 1, antenna radiation is wider, thereby improving the antenna radiation efficiency. In addition, because the first metal sheet 2 is connected to the metal frame 1 and the metal frame 1 is grounded, a connecting device such as a grounding spring of the first metal sheet 2 for connecting to the ground can be omitted.

In the terminal device provided in the embodiments of the present disclosure, the first metal sheet is connected to the metal frame, and the metal frame is used as the part of an antenna radiator, which improves the antenna radiation efficiency. The first metal sheet connected to the metal frame is used as an antenna sheet, the antenna sheet is directly grounded through the metal frame, and a grounding connection device of the first metal sheet is omitted, thereby reducing the costs of the antenna.

Optionally, the metal frame 1 and the first metal sheet 2 are integrally formed.

Herein, the metal frame 1 is used to directly form the first metal sheet 2 through extension, to replace an FPC antenna or an LDS antenna through integral forming, thereby reducing costs. Moreover, due to integral forming design, a connection device such as a spring, or a screw between the metal frame 1 and the first metal sheet 2 is omitted, thereby further reducing the costs.

As an optional implementation, the metal frame 1 has a first protruded portion 6, and the first protruded portion 6 is grounded.

Optionally, the first protruded portion 6 is connected to the grounding plate 5.

Specifically, the connection piece includes: a first connection piece, and the first protruded portion 6 is connected to the grounding plate 5 through the first connection piece.

Figure 3:
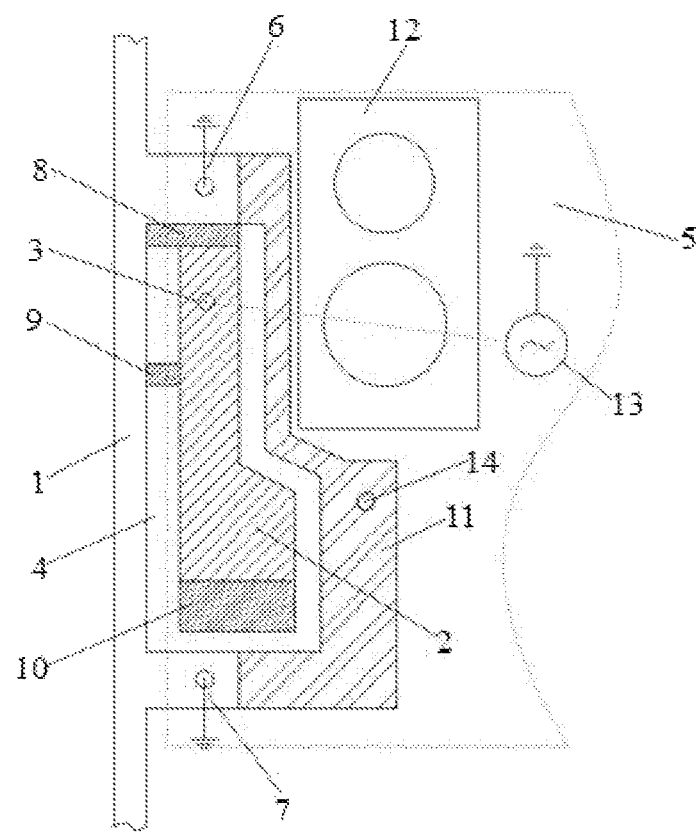
FIG. 3 is a structural schematic diagram 2 of a terminal device according to an embodiment of the present disclosure.

Further, as shown in FIG. 2 and FIG. 3, the second metal sheet 2 is grounded through the first protruded portion 6, that is, the grounding point of the second metal sheet 2 used as the antenna radiator is closer to the plate edge of the metal frame 1. As can be seen from the basic principle of antennas, the radiation range of the antenna is wider, thereby further improving the antenna radiation efficiency.

Further, the metal frame 1 has a second protruded portion 7, and the second protruded portion 7 is grounded. Herein, the second protruded portion 7 and the first protruded portion 6 are separated by a preset distance.

It should be noted that the first protruded portion 6 and the second protruded portion 7 are located on the same side of the metal frame 1, that is, the side of the metal frame 1 close to the grounding plate 5.

Optionally, the second protruded portion 7 is connected to the grounding plate 5.

Specifically, the connection piece also includes: a second connection piece, and the second protruded portion 7 is connected to the grounding plate 5 through the second the connection piece.

Herein, a connection position at which the first protruded portion 6 is connected to the grounding plate 5 through the first connection piece is used as a first grounding point, and a connection position at which the second protruded portion 7 is connected to the grounding plate 5 through the second connection piece is used as a second grounding point. That is, there are two grounding points on the metal frame 1.

Herein, optionally, there is a second gap between the metal frame 1 and the grounding plate 5.

Further, the length of the second gap between the first protruded portion 6 and the second protruded portion 7 is greater than a ¼ wavelength of an antenna operating frequency.

Herein, generally, the length of the second gap is less than the ¼ wavelength of the antenna operating frequency (¼ wavelength changes with the change of the dielectric material around the antenna, for example, the dielectrics of air and plastic correspond to different ¼ wavelengths). Alternatively, when the second gap is directly filled with a metal material, the radiation effect of the metal frame 1 is small, and the main effect is small inductance to the ground.

However, in this implementation, the length of the second gap between the first protruded portion 6 and the second protruded portion 7 is greater than a ¼ wavelength of the antenna operating frequency, the second gap is filled with a non-metal material, and the metal frame 1 participates in radiation as a part of the antenna radiator, which can further improve the antenna radiation efficiency.

In an optional embodiment of the present disclosure, as shown in FIG. 2 and FIG. 3, the terminal device also includes: a first metal arm 8 connected to the metal frame 1; where the first metal sheet 2 is connected to the metal frame 1 through the first metal arm 8.

In other words, the first metal arm 8 is also used as an antenna radiator and participates in the antenna radiation, thus increasing the area required by the antenna and improving the antenna radiation efficiency.

Optionally, the first metal arm 8 is disposed between the first protruded portion 6 and the second protruded portion 7.

Based on this, to further improve the antenna radiation efficiency, the terminal device also includes: a second metal arm 9, disposed between the feed point 3 and an end of the first metal sheet 2 away from the feed point 3, and separately connected to the metal frame 1 and the first metal sheet 2.

Optionally, the second metal arm 9 is provided between the first protruded portion 6 and the second protruded portion 7.

It should be noted that the second metal arm 9 can be disposed close to the feed point 3 or away from the feed point 3, and functions to adjust a resonance frequency of the antenna and participate in antenna radiation. Generally, being closer to the feed point 3 indicates a lower resonance frequency of the antenna; otherwise, a resonance frequency of the antenna is higher.

Herein, when the second metal arm 9 is disposed away from the feed point 3, as shown in FIG. 2 and FIG. 3, as an optional implementation, the terminal device also includes: a second metal sheet 10, connected to an end of the first metal sheet 2 away from the feed point 3, to ensure that resonance frequencies of the antenna are the same. Herein, the second metal arm 9 and the second metal sheet 10 are added to increase the area of the antenna, thereby effectively improving the antenna radiation efficiency.

In addition, the first metal arm 8 is disposed adjacent to the feed point 3, and can be close to the grounding point on the metal frame 1 connected to the grounding plate 5 or close to the second metal arm 9. The first metal arm 8 mainly functions to achieve impedance matching, and serve as an antenna radiator and participate in antenna radiation.

It should be noted that the first metal arm 8 and the second metal arm 9 are located on the same side of the metal frame 1, that is, the side of the metal frame 1 close to the grounding plate 5.

Optionally, the metal frame 1, the first metal sheet 2, the first metal arm 8, the second metal arm 9, and the second metal sheet 10 are integrally formed.

Herein, the metal frame 1 is used to directly form the first metal arm 8, the second metal arm 9, the first metal sheet 2, and the second metal sheet 10 through extension, and the first metal arm 8, the second metal arm 9, the first metal sheet 2, and the second metal sheet 10 are used as antenna radiators, to replace an FPC antenna or an LDS antenna through integral forming, thereby reducing costs. Moreover, due to integral forming design, a connection device such as a spring, a screw, or direct welding between the metal frame 1 and the first metal sheet 2 is omitted, thereby further reducing the costs.

Optionally, the second gap is filled with a non-metal material or a metal material. Optionally, a non-metal material is filled between the first metal sheet 2 and the grounding plate 5.

In an example, if the antenna of the terminal device includes a WIFI 2.4 GHZ antenna, the vertical distance between the first metal sheet 2 and the grounding plate 5 is 1.5 mm, the length and the width of the first metal sheet 2 are about 18 mm*4 mm, the vertical distance between the first metal sheet 2 and the plane of the long side of the metal frame 1 close to the back cover of the terminal is about 1.2 mm, the distance between one end of the first metal sheet 2 and a corresponding grounding point of the metal frame 1 is 1.2 mm, the distance between the other end of the first metal sheet 2 and another corresponding grounding point of the metal frame 1 is 1.2 mm, the distance between the first metal arm 8 and the second metal arm 9 is about 4 mm, and the distance between the two ground points of the metal frame 1 is about 22 mm.

The terminal device in the embodiments can significantly improve the antenna radiation efficiency, and the average antenna radiation efficiency can reach 20%.

As shown in FIG. 3, as an optional implementation, the terminal device can also include: a metal support bracket 11, where the metal support bracket 11 is disposed around the first metal sheet 2 and is separately connected to the metal frame 1 and the grounding plate 5; and a dual-camera module 12 fastened on the metal support bracket 11.

It should be noted that the metal support bracket 11 is disposed around the first metal sheet 2 to meet the requirement on structural strength.

Herein, the metal support bracket 11 can be integrally formed with the metal frame 1 and the first metal sheet 2, and the vertical height of the metal support bracket 11 is basically the same as that of the first metal sheet 2.

A connection position at which the metal support bracket 11 is connected to the grounding plate 5 is used as the third grounding point 14, so that the metal support bracket 11 can be grounded well, thereby reducing absorption of the antenna radiation efficiency by the metal support bracket 11. The requirement on structural strength is met while ensuring that the performance of the antenna basically does not decrease.

In the above embodiments, the terminal device can be a mobile phone, a navigation device, a tablet computer, a personal digital assistant (PDA), a laptop computer, or the like.

The foregoing descriptions are merely the optional implementations of the present disclosure. It should be noted that those of ordinary skill in the art may further make several improvements and refinements without departing from the principles described in the present disclosure, and these improvements and refinements also fall within the protection scope of the present disclosure.

The invention claimed is:

1. A terminal device, comprising:
a metal frame;
a first metal sheet, wherein a feed point is disposed on the first metal sheet, the first metal sheet is connected to the metal frame, and there is a first gap between the metal frame and a part of the first metal sheet that is not connected to the metal frame; and
a grounding plate, wherein the grounding plate is connected to the metal frame through a connection piece;
wherein the terminal device further comprises:
a first metal arm connected to the metal frame;
wherein the first metal sheet is connected to the metal frame through the first metal arm and is used as an antenna sheet;
wherein the terminal device further comprises: a second metal arm, disposed between the feed point and an end of the first metal sheet away from the feed point, and separately connected to the metal frame and the first metal sheet.

2. The terminal device according to claim 1, wherein the metal frame and the first metal sheet are integrally formed.

3. The terminal device according to claim 1, wherein there is a second gap between the metal frame and the grounding plate.

4. The terminal device according to claim 3, wherein the length of the second gap between the first protruded portion and the second protruded portion is greater than a ¼ wavelength of an antenna operating frequency.

5. The terminal device according to claim 1, further comprising:
a second metal sheet, connected to an end of the first metal sheet away from the feed point.

6. The terminal device according to claim 5, wherein the metal frame, the first metal sheet, the first metal arm, the second metal arm, and the second metal sheet are integrally formed.

7. The terminal device according to claim 3, wherein the second gap is filled with a non-metal material or a metal material.

8. The terminal device according to claim 1, wherein a non-metal material is filled between the first metal sheet and the grounding plate.

9. The terminal device according to claim 1, further comprising:
a metal support bracket, wherein the metal support bracket is disposed around the first metal sheet, and is separately connected to the metal frame and the grounding plate; and
a dual-camera module fastened on the metal support bracket.

10. The terminal device according to claim 1, wherein the metal frame has a first protruded portion, and the first protruded portion is grounded.

11. The terminal device according to claim 10, wherein the metal frame has a second protruded portion, and the second protruded portion is grounded.

\* \* \* \* \*